Nov. 10, 1931. S. E. HITT 1,831,247
AIR VALVE FOR AEROFOILS
Filed Feb. 20, 1929 3 Sheets-Sheet 1
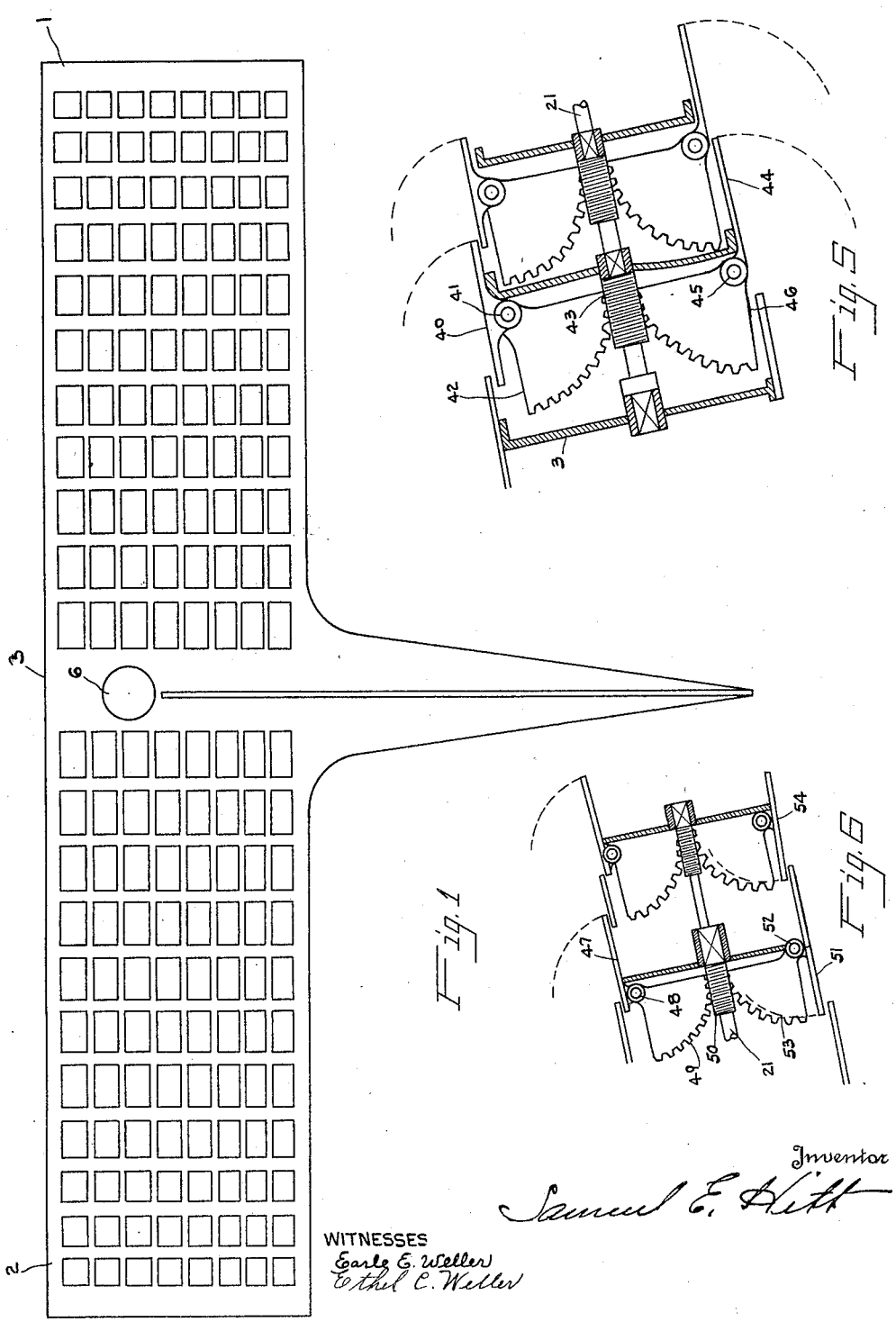

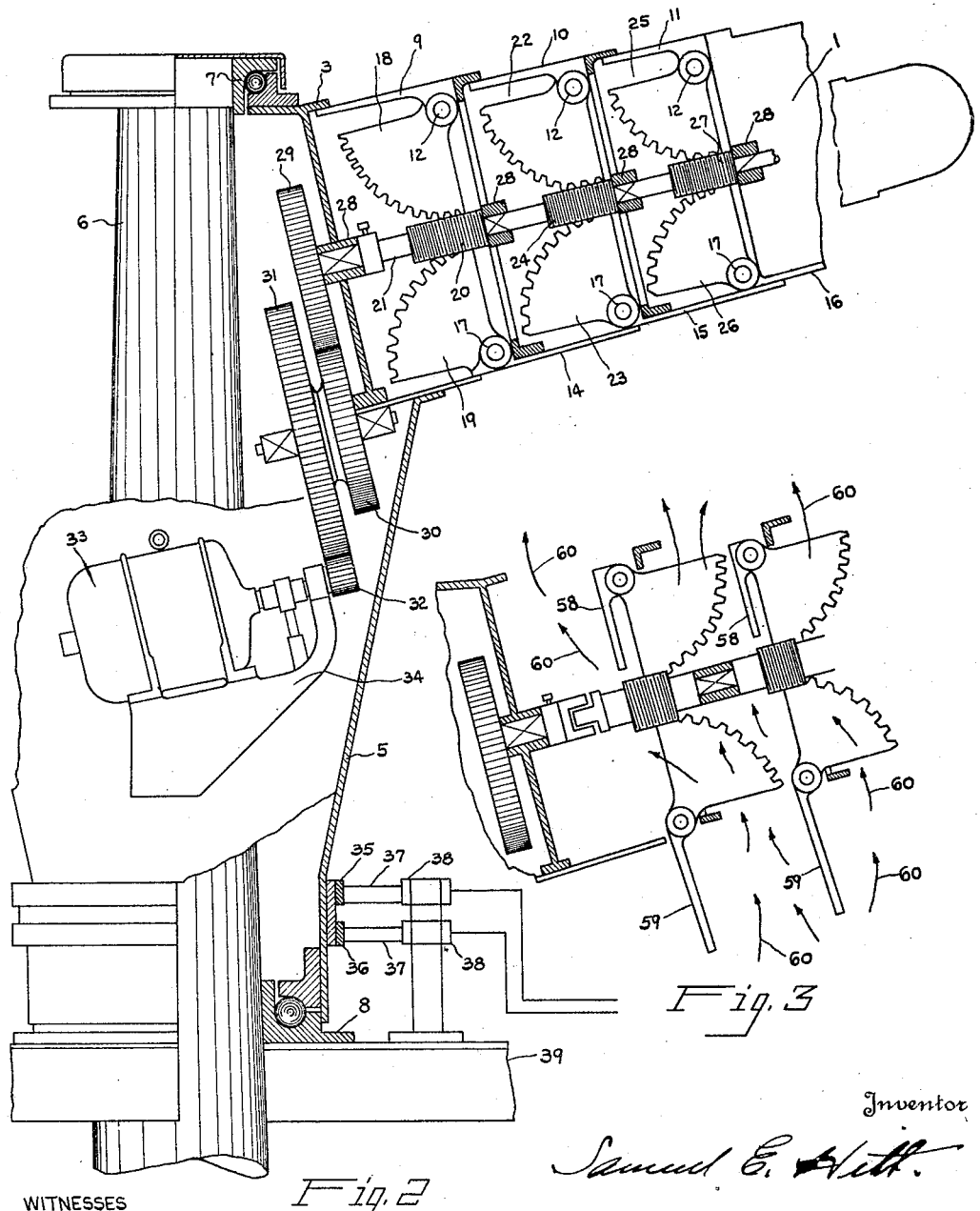

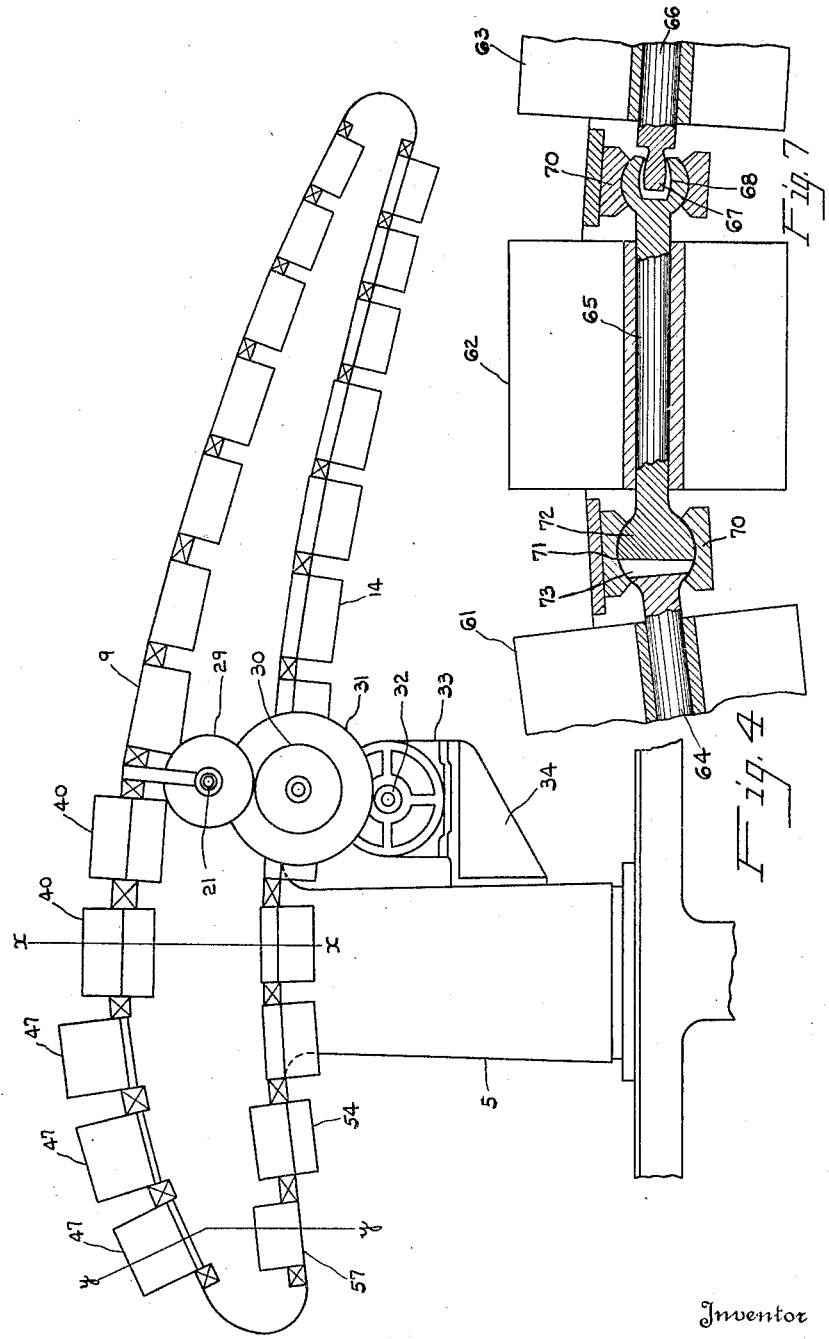

Patented Nov. 10, 1931

1,831,247

UNITED STATES PATENT OFFICE

SAMUEL E. HITT, OF ELYRIA, OHIO

AIR VALVE FOR AEROFOILS

Application filed February 20, 1929. Serial No. 341,538.

My invention relates to aerofoils such as are particularly adaptable to use in my aerohydro-glider, an aeroship which is not intended to rise more than a few hundred feet above the water, illustrated and described in my application air and water craft, filed March 26th, 1928, Serial No. 264,634, and my application aerofoils for aeroships, filed February 11th, 1929, Serial No. 339,231.

An object of my invention is to provide means for reducing the area of the main supporting surfaces of the aerofoil or wing during bad weather in case the aeroship becomes inoperative and settles down on the water to ride out a storm. At sea storms become very severe. For instance, should my aeroship encounter a storm when flying or gliding at from 125 to 160 miles an hour, equal to about twice the velocity of the prevailing wind, the aeroship, if in good running condition, should be able to fly through the storm without serious mishap. However, if anything goes wrong and the pilot finds it necessary or expedient to glide upon the surface of the sea at a reduced speed, possibly less than the velocity of the wind, and the aeroship is in danger of being overturned or of having some of the wings torn off, then the aeroship is allowed to come to, or glide at low speed with the air valves in the supporting surfaces of the wings opened as soon as the valves can be opened. With the air valves open, such a large percentage of the area of the supporting surfaces of the wing is removed that the wing becomes incapable of sustaining either compression or suction. In other words, the wind blows through the perforated wing without causing a serious lift and without danger to the wing.

Another object of my invention is to provide air valves in the top and bottom coverings of wings so that when valves are open, neither compression nor suction is maintained over those surfaces and the wings become inoperative.

Another object of my invention is to provide positive seating of the air valves so that when closed the air valve surfaces are capable of carrying the same loads as the rest of the wing surfaces.

Another object of my invention is to provide means for opening and closing the air valves when the aeroship is making moderate speed upon the water.

Another object of my invention is to provide air valves which cannot possibly be opened when the aeroship is at high speed and either about to leave the water or is flying clear above the water.

Another object of my invention is to provide air valves hinged near the wing supporting surfaces with axes parallel to the fuselage so that no additional resistance to opening of the air valves is caused from opening the air valves against the resultant air current.

Another object of my invention is to provide the air valves that are subjected to suction from without to open in and valves which are subjected to compression from without to open out, so that forces from without acting upon the valves have a tendency to keep them closed.

Another object of my invention is to provide a balanced valve for neutral areas of the aerofoil not subjected to either suction or pressure from without.

Another object of my invention is to provide slow opening and closing of the air valves so that the air valves can be operated while the aeroship is under way.

Another object of my invention is to provide means for opening and closing all the air valves of a wing together without shock or strain upon the wing frame.

Another object of my invention is to provide flexible operating mechanism so that no strains will come upon the air valves or their connections due to the bending of the wing frame.

Another object of my invention is to provide separate operation for air valves of the right and left wings.

Another object of my invention is to reduce the gearing to a minimum.

Another object of my invention is to provide electrical control for the air valves, so that the air valves can be easily operated from the pilot house.

Another object of my invention is to provide mechanism for opening the air valves by operation of an electric motor which also closes the air valves by reversing the electric motor.

Another object of my invention is to provide a safety device to protect the mechanism in case the motor continues to run after the valves are either open or closed.

Another object of my invention is to provide worm gearing for the air valve operation so that a small motor will suffice.

Another object of my invention is to provide an operating mechanism which can be mounted under the wing center.

Another object of my invention is to provide an operating mechanism which is adaptable to be mounted on the sleeve of a pivoted wing.

Another object of my invention is to provide the wing post or sleeve with electrical contact rings for current supply to the motor.

Another object of my invention is to provide a balanced valve pivoted in line with the supporting surface so that the valve is still balanced when unseated and partially open.

Another object of my invention is to provide a mechanism to accomplish the desired purpose of the invention without adding prohibitive weight.

With the above and other objects in view, the invention further includes the following novel features and details of construction, to be hereinafter more fully described, illustrated in the accompanying drawings and pointed out in the appended claims.

Referring to the drawings:—

Fig. 1 is a general plan of the aerofoil showing a pair of wings.

Fig. 2 is a partial longitudinal section of wing, showing the valves closed.

Fig. 3 is a part longitudinal section of wing showing the valves open.

Fig. 4 is a cross section of wing and diagram of valve operating mechanism.

Fig. 5 is a partial longitudinal section of wing on line $x$—$x$ of Fig. 4, showing a balanced air valve in the top surface of wing and an air valve opening downward in the bottom surface of the wing.

Fig. 6 is a partial longitudinal section of wing on line $y$—$y$ of Fig. 4, showing air valves in both top and bottom surfaces of wing opening upward.

Fig. 7 is a detail of the air valve shafting showing couplings between valves.

Referring to the drawings in detail wherein like characters of reference denote corresponding parts, at 1 is the right wing and 2 the left wing of the aerofoil, built together in rigid framework 3 which carries the sleeve 5 supported by bearings 7 and 8 on the mast 6 of the aeroship. 9, 10 and 11 are air valves in the top supporting surface of the wing hinged at 12 as near to the top surface as structural details permit. 14, 15 and 16 are air valves in the bottom supporting surface of the wing, hinged at 17 as near the wing surface as structural details permit.

The air valve series 9 and 14 are opened and closed by quadrant gears 18 and 19, engaged by a worm 20 on a shaft 21 running through to the tip of the wing. In like manner, air valve series 10 and 15 are operated by quadrant gears 22 and 23 and worm 24 on shaft 21. In like manner, air valve series 11 and 16 are operated by quadrant gears 25 and 26 and worm 27 on shaft 21, and so on to the last series of air valves at the wing tip.

Shaft 21, at or near the center of section, runs in bearings 28 supported by framework 3, and driven by gears 29, 30 and 31 which engages pinion 32 of the electric motor 33. The electric motor 33 stands on bracket 34 supported on the sleeve 5. Current is carried to the motor 33 by rings 35—36 mounted on the sleeve 5 and brushes 37 and brush holders 38 on the frame work 39 of the aeroship.

In Fig. 5, the balanced air valve 40 at the top surface of wing is hinged at 41 and operated by quadrant gear 42 engaged by worm 43 on shaft 21. The valve 44 in the bottom surface of wing opens downward, is hinged at 45 and operated by quadrant gear 46 engaged by worm 43 on the shaft 21.

In Fig. 6, the upper valve 47 opens upward, is hinged at 48 and operated by quadrant gear 49 engaged by worm 50 on the shaft 21. The lower valve 51 opens upward, is hinged at 52 and operated by quadrant gear 53 engaged by worm 50 on the shaft 21.

In Fig. 4. on the top surface of wing, the forward valves 47 are subjected to pressure from without, the central valves 40 are in a neutral zone and are therefore balanced, while the remaining valves 9 are under suction from above or pressure from within and therefore open inwardly. On the bottom surface of the wing, the valve 57 is subjected to suction from below and therefore opens upward, the valve 54 is in a neutral zone and is therefore balanced while the remaining valves 14 are subjected to pressure from below and therefore open outwardly.

In Fig. 3, with valves 58 and 59 open, the wind can blow through the fuselage freely as shown by the arrows 60.

In Fig. 7, the valves 61, 62 and 63 are carried by spindles 64, 65 and 66. Spindle 66 has a tongue 67 engaging the groove 68 of the spindle 65. Tongue 67 and groove 68 are formed in spherical enlargements 69 of the ends of the spindles 66 and 65, the spherical ends 69 running in the spherical bearing 70. The combination jaw coupling and universal bearing is shown again at 71 where the tongue 72 and groove 73 are shown at right angles to the jaw coupling shown in bearing 70.

In Fig. 2, 57 is a slip gear coupling between the electric motor 33 and the pinion 32.

The valve operating mechanism will be electrically connected to an indicator on a switch board in the pilot house to show whether the valves of each and every wing are open or closed.

The electric motor is operated from the pilot house with a circuit breaker on the switch board to stop the motor when the air valves are fully closed or seated and also when the air valves are fully opened.

It is difficult to make the adjustment so close that the electric motor 33 will stop exactly at the time when the valves are either just seated or when the valves become fully opened. For this reason a slip gear is provided between the motor 33 and the pinion 32. The slip gear is provided for the reason also that in case the air valves are held tight against the valve seats by forces from without and the pilot desires to open the valves and closes the motor circuit too soon, and no slip gear is provided, then the motor would be unable to start and a fuse would blow out. But with the slip gear 57 between the motor 33 and the air valves, the motor starts up and runs with the valves held closed. When the pilot sees from the indicator that the valves do not respond to the motor, he cuts off the current supply and awaits a more favorable opportunity before attempting again to open the valves.

The operation of my invention is as follows:—

When the weather is bad and a storm becomes so severe that the pilot considers it necessary to come to and allow the aeroship to settle on the water to ride out the storm, it is advisable to reduce the area of the wings, to prevent possible damage from a high wind. This is accomplished in my invention from the pilot house by electric control. When the pilot wishes to reduce the area of a wing, he throws a switch which starts a motor that operates through suitable gearing to open the valves in the upper and lower supporting surfaces of the aerofoil. When it is desired to get under way, the pilot reverses the motor and closes the valves. Also when there is a heavy wind, and the aeroship lists too much to leeward, it may be desirable to render some of the wings inoperative.

When the pilot desires to render one of the wings inoperative, the pilot throws a switch which starts the motor 33, setting in motion reduction gearing, 32, 31, 30, 29 and shaft 21, with worms 20, 24, 28 gears 18, 19, 22, 23, 25, 26 and all the air valves 47, 40, 9, 10, 11 and on the top wing surface and 57, 54, 44, 14, and on the bottom wing surface, with the result that the wing ceases to be a lifting element and becomes a dead load. With the air valves all open, the resistance to wind would be similar to that of a grating, i. e., the wind would not be able to get enough hold upon the wing to cause any damage.

It is apparent that the embodiment of the invention which I have described in detail possesses all the features of advantage enumerated as desirable in the statement of the invention and the above description. It is also evident that numerous changes in the details of construction and in the combination and arrangement of parts may be resorted to without departing from the spirit and scope of the invention as hereinafter claimed without sacrificing any of its advantages.

I claim:—

1. In an aeroship or similar craft, air valves in the main supporting surfaces of the aerofoils, mounted on flexible cross shafting, a longitudinal shaft, worm gearing between the flexible cross shafts and the longitudinal shaft, and means for operating the longitudinal shaft.

2. In an aeroship or similar craft, air valves in the main supporting surfaces of the areofoils, the said air valves mounted on flexible shafting carrying quadrant gears, an electric motor and reduction gearing between the said motor and the said quadrant gears.

3. In an aeroship or similar craft, a wing including two superposed planes or upwardly convexed cross-section each provided with openings spaced behind one another, valves respectively controlling the said openings, and separate mountings for the valves; the mountings being arranged so that those valves in each plane which are subject to suction during the flying of the aeroplane will open toward the companion plane, and so that those valves in each plane which are subject to compression during the flying of the aeroplane will open away from the companion plane, and so that those valves which are not normally subject either to compression or suction during the flying of the aeroplane are balanced.

4. In an aeroship or similar craft, a wing having spaced upper and lower supporting planes each provided with openings; and valves all pivoted on axes longitudinal of the aeroship and respectively normally closing the said openings, the valves associated with the two planes respectively having their pivot axes laterally inward and laterally outward of the openings normally closed by them.

5. In an aeroship or similar craft, a wing having spaced upper and lower supporting planes each provided with openings; valves pivotally connected to each plane and respectively normally closing the said openings; the pivot axes of the valves being so disposed that the valves normally subject to suction swing during their opening movement into the space between the planes, and so that the valves normally subject to compression from the exterior of the wing swing away from the said space during their opening movement; and means for conjointly opening and closing all of the valves.

6. In an aeroship or similar craft, a wing having spaced upper and lower supporting planes provided with relatively superposed openings; balanced valves controlling certain of the superposed openings; an assemblage of valves respectively controlling the other openings in both planes, and means for conjointly moving the said assemblage of valves.

7. In an aeroship or similar craft, an upwardly convexed wing having a plurality of openings spaced from each other longitudinally of the aeroship, balanced valves automatically controlling the uppermost openings, an assemblage of gravitationally unbalanced valves respectively controlling the other openings, and means under control of the operator of the aeroship for moving all of the said valves.

8. In an aeroship or similar craft, a wing including a plane of curved vertical cross-section longitudinally of the aeroship and having a row of openings spaced behind one another, shaft sections respectively adjacent to the openings of the said row and each substantially parallel to the adjacent plane, flexible joints respectively connecting the consecutive shaft sections, and valves respectively fastened to the said shaft sections and each controlling an opening adjacent to the shaft section to which the valve is fastened.

9. In an aeroship or similar craft, a wing including two superposed planes of curved cross-section, the two planes having relatively superposed openings, shaft sections supported between the two planes, flexible joints respectively connecting consecutive shaft sections, and two valves operatively connected to each shaft section and respectively controlling superposed openings in the two planes.

In testimony whereof I affix my signature.

SAMUEL E. HITT.